United States Patent [19]

Park

[11] Patent Number: 5,711,893
[45] Date of Patent: Jan. 27, 1998

[54] NI-CU-ZN FERRITE

[75] Inventor: Jonghak Park, Seoul, Rep. of Korea

[73] Assignee: Samsung Corning Co., Ltd., Suwon, Rep. of Korea

[21] Appl. No.: 546,928

[22] Filed: Oct. 23, 1995

[30] Foreign Application Priority Data

May 31, 1995 [KR] Rep. of Korea .......... 95-14262

[51] Int. Cl.⁶ .................................................. C04B 35/28
[52] U.S. Cl. ............................. 252/62.62; 252/62.59; 252/62.6
[58] Field of Search ................. 252/62.62, 62.59, 252/62.6

[56] References Cited

U.S. PATENT DOCUMENTS 4,521,323  6/1985  Hirota et al. .................... 252/62.62

FOREIGN PATENT DOCUMENTS 2-137767  5/1990  Japan .
2137767   5/1990  Rep. of Korea .

*Primary Examiner*—Melissa Bonner
*Attorney, Agent, or Firm*—Christie, Parker & Hale, LLP

[57] ABSTRACT

Disclosed in this invention is a magnetic material comprising the main components consisting of 14.0 to 19.0 mol. % of NiO, 29.0 to 35.0 mol. % of ZnO, 3.0 to 6.0 % by weight of CuO, and the remainder $Fe_2O_3$; the sub-components consisting of less than 0.02% by weight of $SiO_2$ (not including 0%), less than 0.02% by weight of CaO (not including 0%), and less than 0.1% by weight of $Bi_2O_3$ (not including 0%), and the additives consisting of 0.1 to 0.3% by weight of MgO and 0.1 to 0.4% by weight of MnO. The material is provided with good physical characteristics of low magnetic loss, high initial permeability, and high strength.

5 Claims, 5 Drawing Sheets

NI-CU-ZN FERRITE

BACKGROUND OF THE INVENTION

1. Field of the Invention

The present invention relates to a magnetic material containing an Ni—Cu—Zn base which is suitable as a core for a rotary transformer in a VCR, and more specifically, to an Ni—Cu—Zn ferrite which requires various characteristics of high toughness, high flexural strength and the like which are needed to operate under high frequency region, to have an initial permeability of at least 450 and low magnetic loss, and also to grind with high precision in the shape of a transformer core.

2. Description of the Related Arts

Conventionally, in manufacturing the core product for a rotary transformer, nickel oxide (NiO), zinc oxide (ZnO), cupric oxide (CuO) and the remainder, ferric oxide ($Fe_2O_3$) were mixed, calcined, finely crushed and granulated. The pressed product was sintered at air atmosphere. In order to increase the efficiency of the transformer by lowering leakage of magnetic flux, protruded parts were grounded with high precision so that effective permeability would be increased. However, when the precision of grinding was increased, the problems are that when it took a long time to grind there was a decrease of grinding efficiency, thereby increasing production cost. Japanese Patent laid-open No. 90-137767 describes that grinding is required to improve toughness and flexural strength of the core without decreasing the grinding rate.

Furthermore, even though improvement of the effective permeability can be expected depending upon the degree of grinding, unnecessary fine grinding with respect to intrinsic initial permeability of materials is not always considered to be desirable. Moreover, grinding is required to reduce magnetic loss which is closely related to the efficiency of transformer.

Conventionally, many attempts have been made in order to meet various characteristics required in the magnetic material. However, the problem is that if one characteristic of the material is satisfied, then another characteristic of the material is sacrificed, which is, so-called, balance rule of the counterpart.

SUMMARY OF THE INVENTION

In order to solve the problems of the conventional art described above, in the present invention extensive studies have been conducted based on the impurity of ferric oxide which was a by-product in manufacturing steel plate. As a result, desirable characteristics have been obtained to satisfy coincidently high initial permeability, low magnetic loss, high flexural strength of core by admixing a very small amount of manganese oxide (MnO) and magnesium oxide (MgO).

Accordingly, an object of this invention is to provide a magnetic material having high strength, high initial permeability and low magnetic loss.

Generally, although high toughness and high strength are maintained to an initial permeability of about 500, it is difficult to obtain an initial permeability of about 800 under the state of high toughness and high strength. However, it has now been found that the value of the magnetic permeability can be easily obtained according to this invention. Moreover, because the value of effective permeability required for rotary transformer varies depending upon the type of rotary transformers, various means for processing material for a variety of rotary transformers can be provided by simply varying the amount of MnO to be added in the range of 0.1 to 0.4 wt % without changing any other process conditions. As a result of simply adding MnO, the initial permeability value can be varied from 600 to 800 which amounts to about 30% change, without deteriorating other characteristics.

Accordingly, this invention is to provide a magnetic material comprising the main components including 14 to 19% by mol NiO, 29 to 35% by mol ZnO, 3 to 6% by mol CuO and the remainder of $Fe_2O_3$; the sub-components including less than 0.02% by weight of $SiO_2$ (not including 0%), less than 0.02% by weight of CaO (not including 0%) and less than 0.1% by weight of $Bi_2O_3$ (not including 0%); and the additives including 0.1 to 0.3% by weight of MgO and 0.1 to 0.4% by weight of MnO.

In an Ni—Cu—Zn ferrite according to the present invention, when the sub-components include less than 0.02% by weight of $SiO_2$, less than 0.02% by weight of CaO (not including 0%), less than 0.07% by weight of $Bi_2O_3$ (not including 0%) are added to the main components including 14 to 19% by mol NiO, 29 to 35% by mol ZnO, 3 to 6% by mol CuO by mol of CuO and the remainder, $Fe_2O_3$, the initial permeability is increased by the grain growth, while, there is a tendency to increase the magnetic loss.

On the other hand, when 0.1 to 0.5% by weight of MgO is added to this composition, toughness and strength are increased, but the initial permeability is greatly decreased.

However, comprehensive investigation has been made as to the effects of 0.1 to 0.3% by weight of MgO added and MnO present in the ferric oxide on the characteristics of the magnetic material.

As a result, it has been found that the initial permeability is increased and the magnetic loss is decreased by co-adding MgO in the range of the amount of 0.1 to 0.3% by weight and MnO in the amount of 0.1 to 0.4% by weight.

Namely, in the conventional technique, it has been known that in order to achieve high toughness and high strength, a very small amount of the additives are used, but it generally leads to the decreasing of µiQ product.

However, according to this invention, high toughness and high strength can be obtained without decreasing the value of µiQ product.

The range of the main composition in the material is limited to the compounds having more than 100° C. of Curie temperature for intended use, and is determined by the amount of % by mol of NiO+CuO which are located at the site of inverse spinel structure and the amount of % by mol of ZnO which is located at the site of normal spinel structure.

Further, the amounts of the main components are determined by the combination of these components in the range of an initial permeability of at least 450, followed by the addition of % by weight of MnO and MgO to easily obtain an initial permeability in the range of from about 450 to 800.

Accordingly, it has been confirmed that the magnetic material, which meets low loss (including resistivity), high strength and high toughness, can be obtained within the region of less than the limit of the content of each of $SiO_2$, CaO and $Bi_2O_3$ as well as the specific amount of MnO+MgO to be added.

DETAILED DESCRIPTION OF THE INVENTION

The present invention is further explained in more detail with reference to the following examples which should not be construed to limit this invention.

[Example 1]

Figure 1:
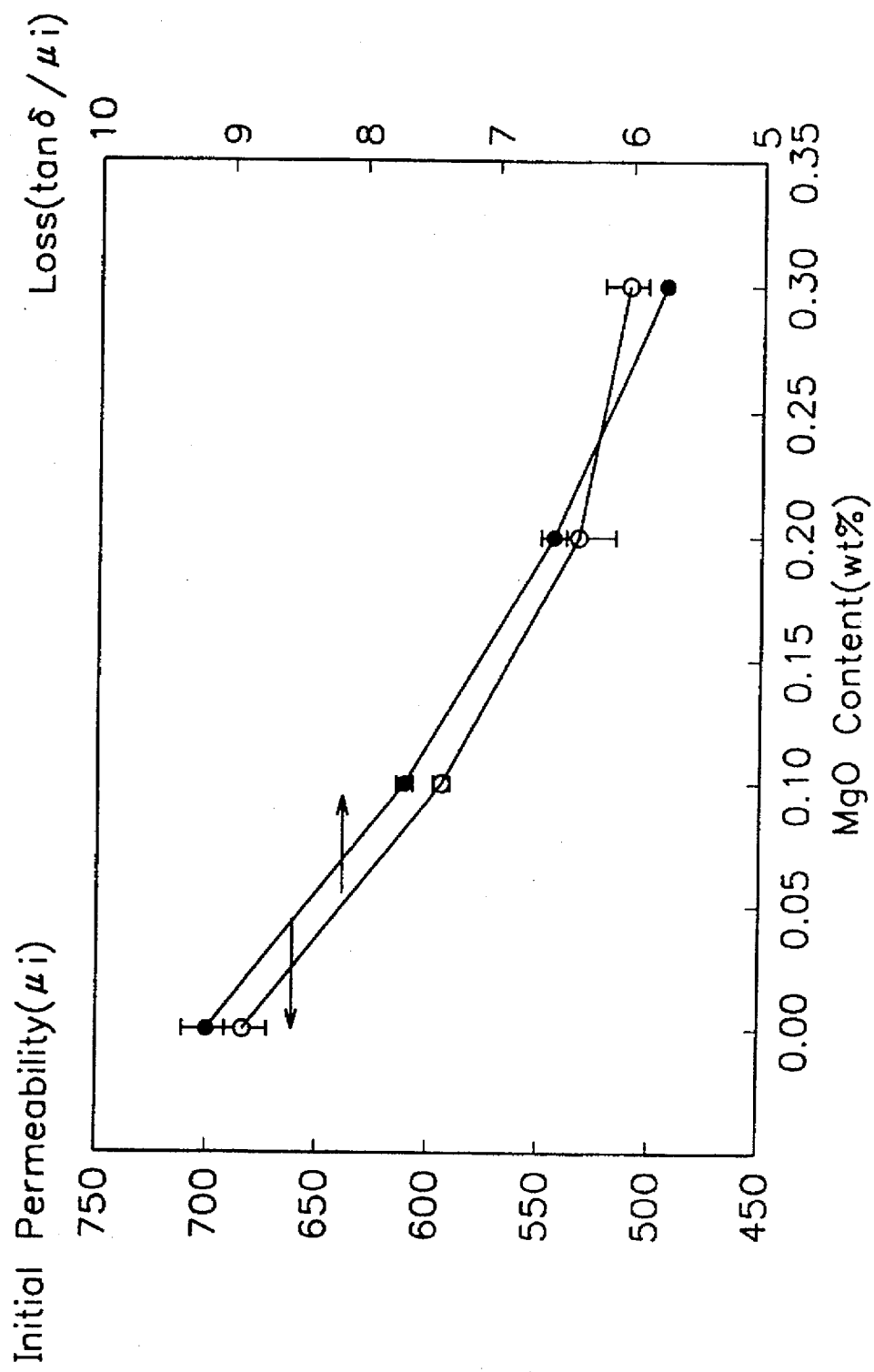
FIG. 1 is a graph showing changes of initial permeability and magnetic loss according to the added amount of MgO.

Each of 0.0, 0.1, 0.2 and 0.3% by weight of MgO was added to the powder in which the sub-components including 0.006% by weight of $SiO_2$, 0.006% by weight of CaO, 0.1% by weight of MnO and 0.035% by weight of $Bi_2O_3$ were added to the main composition including 32.15% by mol of ZnO, 14.67% by mol of NiO, 5.64% by mol of CuO and the remainder, $Fe_2O_3$, and mixed with water. After drying, the mixture was calcined at a temperature of 900° C., which was then finely crushed and granulated by a spray drier. Thereafter, the granulated mixture was formed by a press, and sintered at a temperature of 1080° C. for 1 hour. The initial permeability in 1 MHz and the magnetic loss of each of the samples were measured, as shown in FIG. 1. Also, the flexural strength of the sample was measured as shown in FIG. 2.

As shown in FIG. 1, when the amount of MgO to be added is increased in the powder composed of the components described above, the magnetic loss shows a tendency to be reduced. When 0.3% by weight of MgO is added to the composition, then the loss characteristic is improved, e.g., the magnetic loss is reduced by about 32% when compared with that without the addition of MgO. Whereas, the initial permeability characteristic is deteriorated as MgO is added thereto, e.g., when 0.1% by weight of MgO is added, and then the value of the initial permeability is reduced by 13%, when 0.3% by weight of MgO is added, and then the value of the initial permeability is reduced by 39%.

Figure 2:
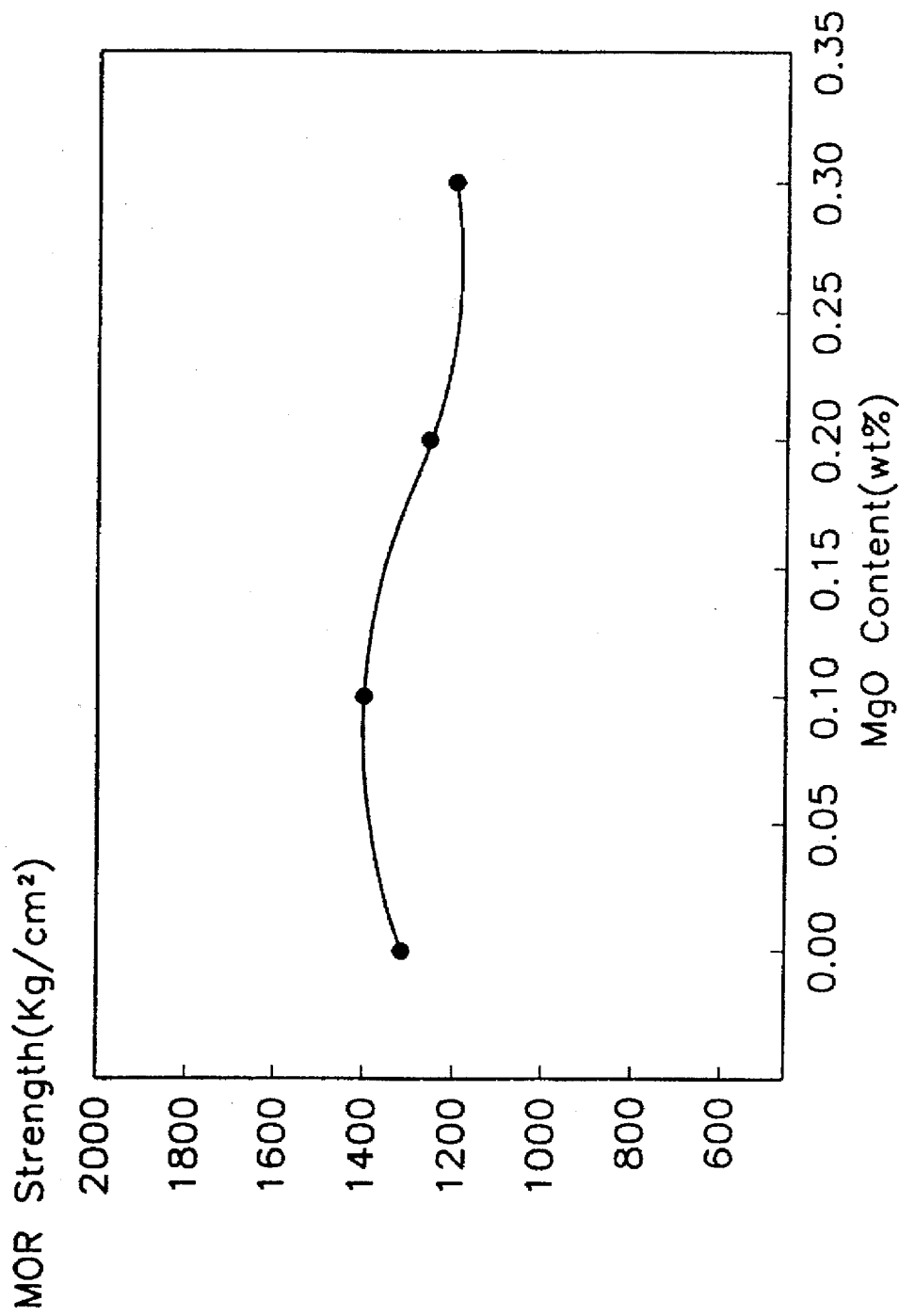
FIG. 2 is a graph showing change of flexural strength according to the added amount of MgO.

As shown in FIG. 2, the value of flexural strength depending upon the added amount of MgO is increased until the added amount of MgO is 0.1% by weight, and at that point, its value is maximized. However, it is seen that when more than 0.1% by weight of MgO is added, contrarily, the value of flexural strength is reduced.

As described above, it is confirmed that when less than 0.3% by weight MgO alone is added to the powder containing NiO, CuO, ZnO and $Fe_2O_3$ as the main component, characteristics of magnetic loss is improved depending upon the added amount of MgO, but the initial permeability is decreased, whereas the strength of the sample can be increased by adding an appropriate amount of MgO.

[Example 2]

A sample was prepared by the same procedure as in example 1. Each of 0.0, 0.1, 0.2 and 0.3% by weight of MnO was added to the powder in which the sub-components including 0.006% by weight of $SiO_2$, 0.006% by weight of CaO, 0.1% by weight of MnO and 0.035% by weight $Bi_2O_3$ were added to the main composition in Example 1.

Figure 3:
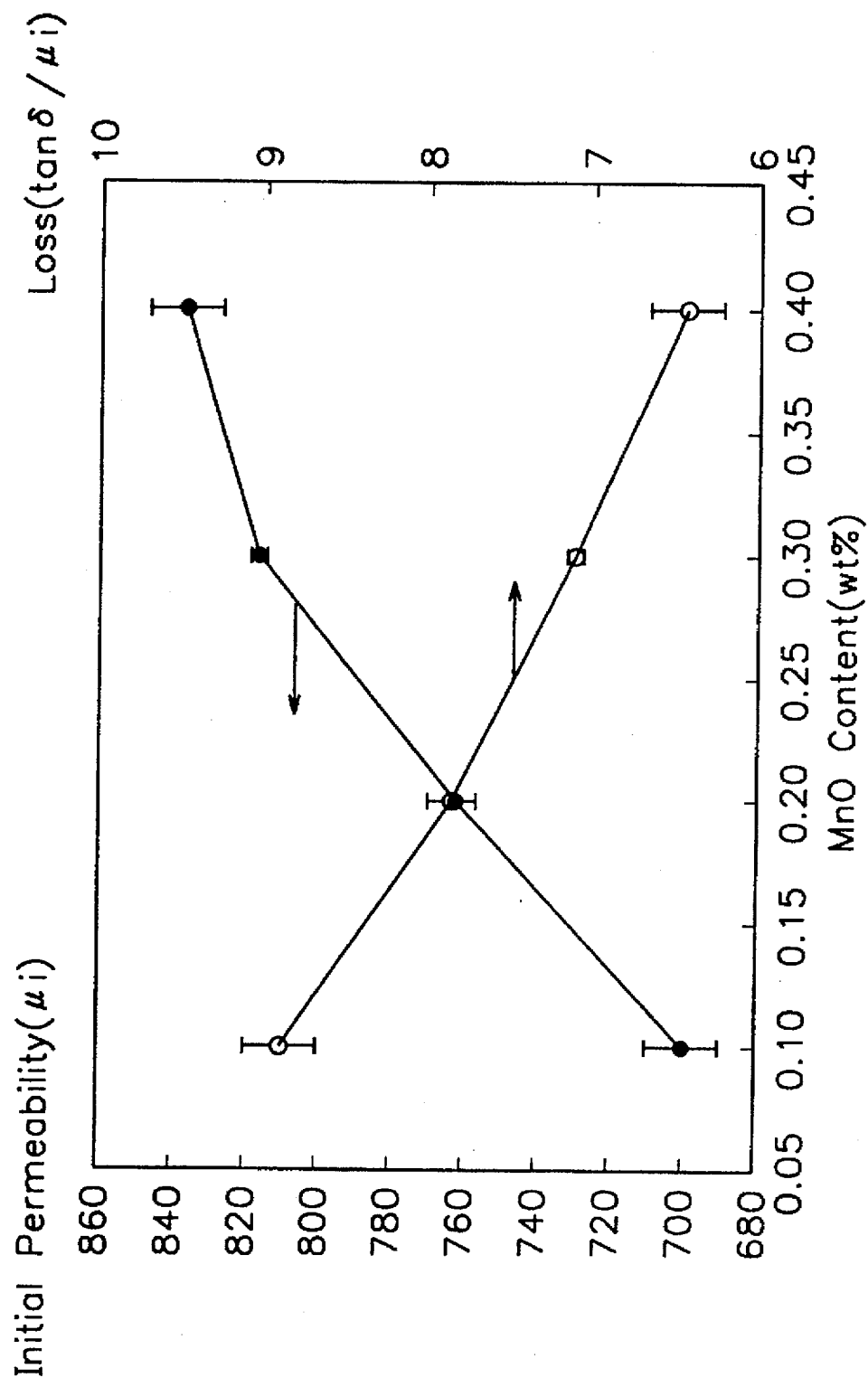
FIG. 3 is a graph showing changes of initial permeability and magnetic loss according to the added amount of MnO.

The initial permeability in 1 MHz and the magnetic loss of each of the samples were measured as shown in FIG. 3.

Figure 4:
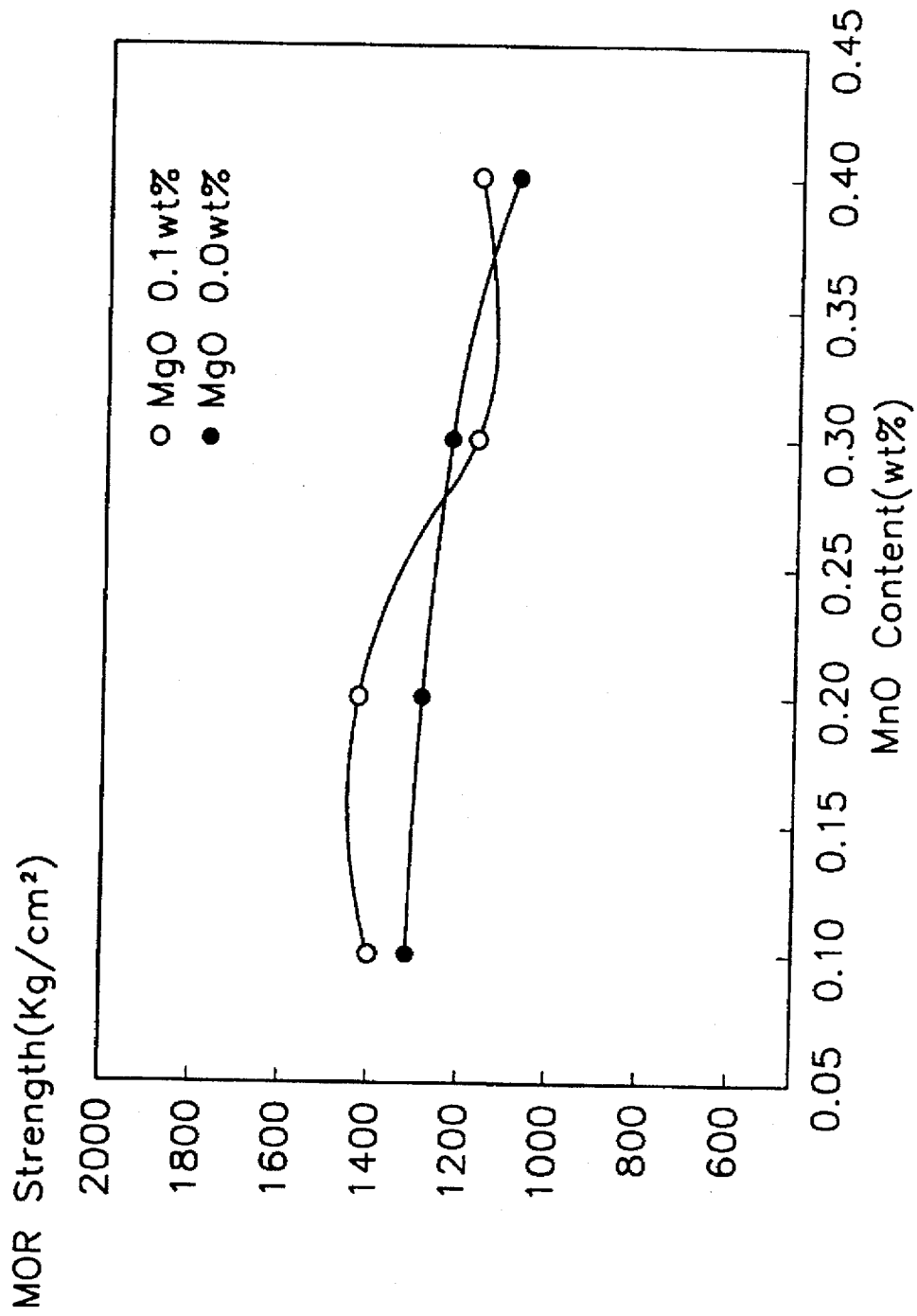
FIG. 4 is a graph showing flexural strength change according to the added amount of MnO.

The change of flexural strength of the sample was also measured as shown in FIG. 4.

As shown in FIG. 3, the initial permeability is increased as MnO is added to the powder containing the above components, namely when MnO content is 0.4%, the initial permeability is decreased by about 20% compared with that of 0.1% by weight of MnO. Further, it was observed that the value of the magnetic loss is reduced as the added amount of MnO is increased, and when MnO content is 0.4% by weight, the magnetic loss is reduced by about 27% compared with that of 0.1% by weight of MnO. On the other hand, it showed a tendency to decrease the flexural strength depending upon the added amount of MnO, but there was no significant difference in the strength.

[Example 3]

A sample was prepared by the same procedure as in Example 1 except using 0.0 to 0.3% by weight of MnO in place of 0.0 to 0.3% by weight of MgO, and further using 0.1% by weight of MgO in the additives.

Figure 5:
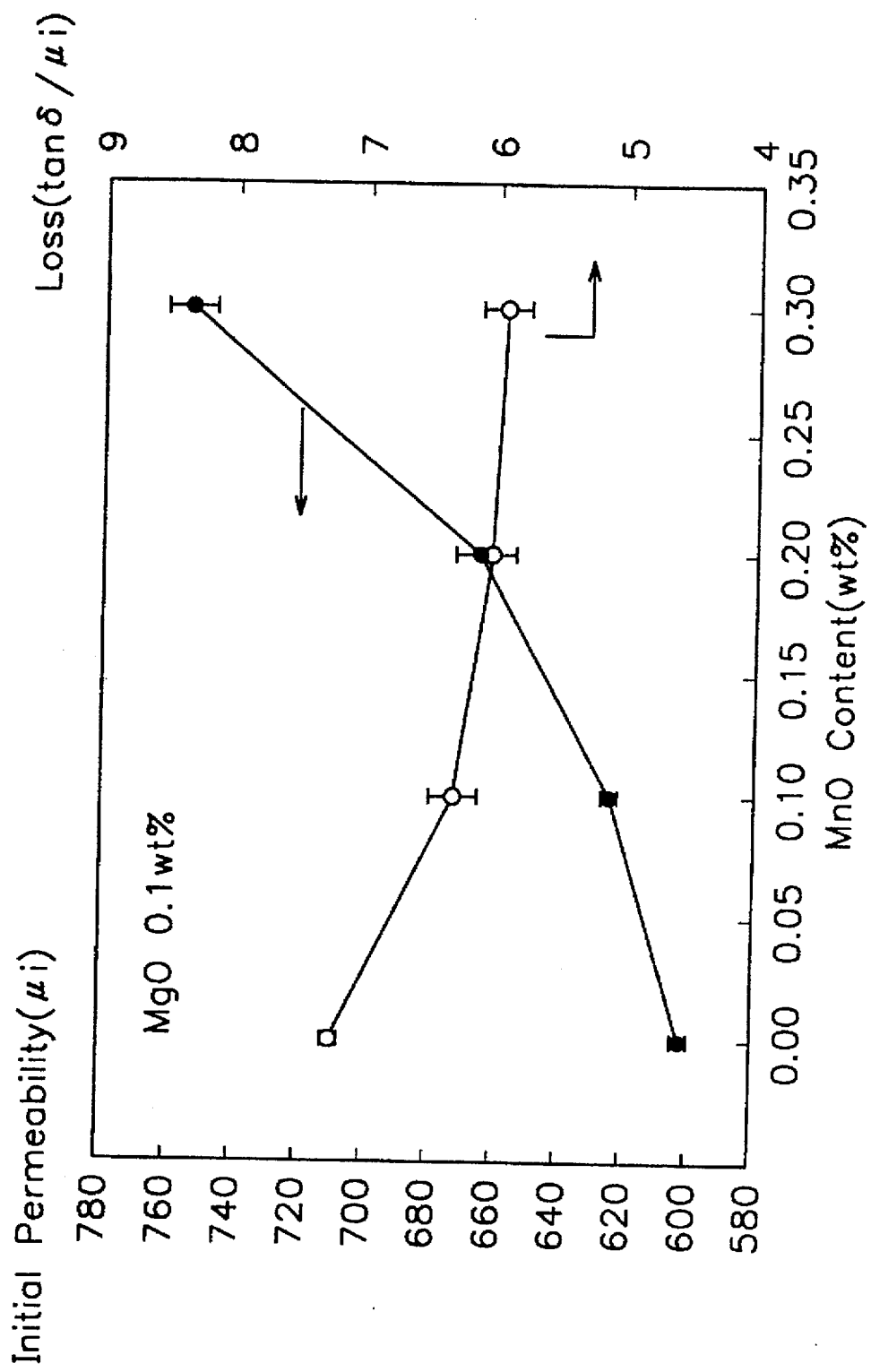
FIG. 5 is a graph showing changes of initial permeability and magnetic loss according to the added amount of the mixture of MgO and MnO.

The initial permeability in 1 MHz and the magnetic loss of each of the samples were measured shown in FIG. 5. The flexural strength of the samples were also measured as shown in FIG. 4.

As shown in FIG. 5, when the added amount of MnO to the above composition is increased, the initial permeability is increased and the magnetic loss is reduced.

As shown in FIG. 4, the flexural strength shows a tendency to be reduced as the added amount of MnO is increased, but when MnO content is 0.2% by weight, the flexural strength is substantially identical to that of 0.1% by weight.

In accordance with the results described above, it is possible to improve the characteristics of the magnetic material wherein less than 0.3% by weight of MgO and less than 0.4% by weight of MnO are added to the powder having NiO, CuO, ZnO and $Fe_2O_3$ as the main components, the initial permeability is increased, the magnetic loss is reduced and the flexural strength is increased.

In this invention, an Ni—Cu—Zn ferrite having the properties of high initial permeability, low magnetic loss and high strength which is suitable for use as a core can be obtained.

It can be advantageous to provide a variety of Ni—Cu—Zn ferrite which are useful for rotary transformers, EE and EI type cores for high frequency, and U type core for fly back transformers (FBT), etc., in which it is required to change effective permeability depending upon the degree of grinding.

What is claimed is:

1. A magnetic material comprising:
   (a) main components including in the range of from 14 to 19% by mol of NiO, 29 to 35% by mol of ZnO, 3 to 6% by mol of CuO, and a remainder of $Fe_2O_3$;
   (b) sub-components including less than 0.02% by weight $SiO_2$ (not including 0%), less than 0.02% by weight CaO (not including 0%), and less than 0.1% by weight of $Bi_2O_3$ (not including 0%); and
   (c) additives including in the range of from 0.1 to 0.3% by weight MgO and greater than about 0.1 to about 0.4% by weight MnO.

2. A magnetic material comprising:
   (a) main components including in the range of from 14 to 19% by mol of NiO, 29 to 35% by mol of ZnO, 3 to 6% by mol of CuO, and a remaining amount of $Fe_2O_3$;

(b) sub-components including less than 0.02% by weight $SiO_2$ (not including 0%), less than 0.02% by weight CaO (not including 0%), and less than 0.1% by weight of $Bi_2O_3$ (not including 0%); and (c) additives added to the main components and subcomponents to form the magnetic material, the additives including in the range of from 0.1 to 0.3% by weight MgO and greater than about 0.1 to about 0.4% by weight MnO., wherein the magnetic material has an initial magnetic permeability in the range of from about 450 to 600.

3. A magnetic material prepared by combining:

main components comprising NiO, ZnO, CuO, end $Fe_2O_3$; with sub-components comprising $SiO_2$, CaO, and $Bi_2O_3$; and adding to the combined main components and subcomponents;

additives including MgO and MnO, wherein the MnO is present in the range of from greater than about 0.1 to about 0.4% by weight to form a mixture;

calcining the mixture;

finely crushing and granulating the calcined mixture;

pressing the crushed and granulated calcined mixture to produce a formed mixture; and sintering the formed material to produce the magnetic material.

4. The magnetic material as recited in claim 3 wherein in the range of from about 0.1 to 0.3% by weight MgO is added to the combined components and subcomponents.

5. The magnetic material as recited in claim 3 having an initial magnetic permeability in the range of from about 450 to 600.

* * * * *

UNITED STATES PATENT AND TRADEMARK OFFICE
CERTIFICATE OF CORRECTION

PATENT NO. : 5,711,893
DATED : January 27, 1998
INVENTOR(S) : Jonghak Park

It is certified that error appears in the above-identified patent and that said Letters Patent is hereby corrected as shown below:

Abstract, line 4, change "$Fe_2O3$" to -- $Fe_2O_3$ --.
Column 5, line 9, change "$MnO.,$" to -- $MnO,$ --.
Column 5, line 13, change "end" to -- and --.

Signed and Sealed this

Twentieth Day of July, 1999

Attest:

Q. TODD DICKINSON

*Attesting Officer*     *Acting Commissioner of Patents and Trademarks*